United States Patent
Yazdani et al.

(10) Patent No.: US 9,612,103 B2
(45) Date of Patent: Apr. 4, 2017

(54) ROTARY VARIABLE DIFFERENTIAL TRANSFORMER (RVDT) SENSOR ASSEMBLY WITH AUXILIARY OUTPUT SIGNAL

(75) Inventors: Saeed Yazdani, Moorpark, CA (US); Hashmat Aziz, Newbury Park, CA (US)

(73) Assignee: KAVLICO CORPORATION, Moorpark, CA (US)

( * ) Notice: Subject to any disclaimer, the term of this patent is extended or adjusted under 35 U.S.C. 154(b) by 361 days.

(21) Appl. No.: 14/374,667

(22) PCT Filed: Jan. 27, 2012

(86) PCT No.: PCT/US2012/022986
§ 371 (c)(1),
(2), (4) Date: Oct. 27, 2014

(87) PCT Pub. No.: WO2013/112181
PCT Pub. Date: Aug. 1, 2013

(65) Prior Publication Data
US 2015/0042321 A1  Feb. 12, 2015

(51) Int. Cl.
*G01B 7/30* (2006.01)
*G01D 5/22* (2006.01)
*G01D 5/20* (2006.01)

(52) U.S. Cl.
CPC ............. *G01B 7/30* (2013.01); *G01D 5/2006* (2013.01); *G01D 5/2258* (2013.01); *G01D 5/2291* (2013.01)

(58) Field of Classification Search
CPC ...... F15B 15/2518; G05B 2219/37019; G05B 2219/37031; G05B 2219/37123;
(Continued)

(56) References Cited

U.S. PATENT DOCUMENTS

| 3,491,321 A | 1/1970 | Chass |
| 3,551,866 A | 12/1970 | Chass |

(Continued)

FOREIGN PATENT DOCUMENTS

| CN | 1472612 A | 2/2004 |
| CN | 1646882 A | 7/2005 |

(Continued)

OTHER PUBLICATIONS

State Intellectual Property Office of the P.R.C. (SIPO) 1st Office Action and Search Report for Application No. 201280071827.0 dated Apr. 5, 2016, 9 pgs.

(Continued)

*Primary Examiner* — Tung X Nguyen
*Assistant Examiner* — Robert P Alejnikov, Jr.
(74) *Attorney, Agent, or Firm* — Hunter Clark PLLC

(57) ABSTRACT

Disclosed are assemblies, systems, devices and methods, including an assembly to determine an angular position of a rotatable structure external to the assembly. The assembly includes a sensor including a rotatable member, a main winding set and at least one auxiliary winding, and also a coupling element to couple the sensor to the external rotatable structure to cause rotation of the rotatable member of the sensor in response to rotation of the external rotatable structure. Resultant voltages at the main winding set and at the at least one auxiliary winding are produced based, at least in part, on an angular position of the rotatable member of the sensor. The angular position of the external rotatable structure is determined based on the resultant voltages at the main winding set and at the at least one auxiliary winding.

27 Claims, 19 Drawing Sheets

(58) Field of Classification Search
CPC ............ G05B 2219/37133; G04C 5/00; H02K 49/102; G01B 7/30; G01D 5/2258; G01D 5/2006; G01D 5/2291
USPC ......... 324/207.18, 207.25; 702/150; 318/656
See application file for complete search history.

(56) References Cited

U.S. PATENT DOCUMENTS

| | | | |
|---|---|---|---|
| 4,345,230 A | | 8/1982 | Chass |
| 4,445,103 A | * | 4/1984 | Chass ................ H01F 21/06 323/348 |
| 4,644,270 A | * | 2/1987 | Oates .................. G01H 1/006 324/103 P |
| 4,750,862 A | | 6/1988 | Barnes et al. |
| 4,910,488 A | * | 3/1990 | Davis .................. H01F 38/18 336/135 |
| 5,358,215 A | * | 10/1994 | Buth .................. B60G 17/0525 251/129.15 |
| 5,883,487 A | * | 3/1999 | Rosenzweig ............ G01P 3/48 318/459 |
| 6,641,085 B1 | | 11/2003 | Delea et al. |
| 7,353,608 B2 | | 4/2008 | Yazdani |
| 2004/0020532 A1 | | 2/2004 | Tanaka et al. |
| 2005/0093538 A1 | | 5/2005 | Nakano et al. |
| 2005/0184726 A1 | | 8/2005 | Watanabe et al. |
| 2008/0303490 A1 | * | 12/2008 | Xu ........................ H02K 19/26 322/29 |
| 2011/0074400 A1 | | 3/2011 | Nakano et al. |
| 2011/0147514 A1 | * | 6/2011 | Straub ................ G01D 5/2455 244/50 |

FOREIGN PATENT DOCUMENTS

| | | |
|---|---|---|
| CN | 1657878 A | 8/2005 |
| CN | 102047079 A | 5/2011 |
| EP | 1473547 A1 | 11/2004 |
| JP | S61159101 A | 7/1986 |
| JP | 02-030229 | 1/1990 |
| JP | H0230229 A | 1/1990 |
| JP | 08-313295 A | 11/1996 |
| JP | 2002525515 A | 8/2002 |
| JP | 2003042805 A | 2/2003 |
| JP | 2004-061458 A | 2/2004 |
| JP | 2011-017563 A | 7/2009 |
| JP | 2009530595 A | 8/2009 |
| JP | 2011232122 A | 11/2011 |
| WO | 0016464 A2 | 3/2000 |
| WO | 2007104890 A3 | 1/2008 |

OTHER PUBLICATIONS

Japan Patent Offfice (JPO) Office Action for Application No. 2014-554703 dated Dec. 15, 2015 (Translation & Original), 10 pgs.
International Search Report & Written Opinion of the International Search Authority (KR) dated Oct. 30, 2012, for International Application No. PCT/US2012/022986, 11 pg.
International Preliminary Report on Patentability for International Application No. PCT/US2012/022986, dated Aug. 7, 2014, 6 pgs.
Extended European Search Report (European Search Report & European Search Opinion) dated Sep. 11, 2015 for European Application No. EP12866781, 7 pgs.
Japan Patent Offfice (JPO) 2nd Office Action for Application No. 2014-554703 dated Sep. 6, 2016 (Translation & Original), 8 pgs.

* cited by examiner

ROTARY VARIABLE DIFFERENTIAL TRANSFORMER (RVDT) SENSOR ASSEMBLY WITH AUXILIARY OUTPUT SIGNAL

BACKGROUND

Sensors implemented using rotary variable differential transformers are generally used when accurate determination of the angular position of a structure is required. For example, it is important to determine, and if necessary to correct, the angular position and/or orientation of the wheels of a landing gear of an aircraft (e.g., if, during landing, the wheels are not substantially parallel to the longitudinal axis of the fuselage, the wheels may break or the aircraft may go off the runway). More than one angular position may be associated with measurements performed by an RVDT sensor, thus creating an ambiguity as to the correct angular position of the structure being monitored/measured.

SUMMARY

Disclosed are assemblies, systems, devices and methods to determine angular position of an external rotatable structure (e.g., such as a nose wheel of a landing gear of an aircraft) based on measured voltages at output windings of an RVDT sensor.

Implementations provided herein are configured to enable a sensor (e.g., RVDT sensor) to directly engage onto a nose wheel landing gear strut, or some other external rotatable structure, to thus determine the angle of rotation of the nose wheel (or other structures). A flexible gear on the sensor assembly enables anti-backlash engagement onto the gear mounted on the nose wheel strut. In some embodiments, an RVDT sensor assembly is configured to compensate for eccentricity of the gear of the external rotatable structure (within +/−1 mm) and the flexible gear on the sensor assembly can comply without a change or breaking the sensor's input gear. The RVDT installed on the sensor assembly may be hermetically sealed. Such an implementation may reduce or altogether prevent moisture or other foreign particles from seeping or permeating into the winding cavity of the RVDT.

In some embodiments, the RVDT may be a single cycle RVDT that, unlike conventional (dual cycle) RVDTs, has only two electrical zeros. One zero will generate an output with positive slope and one will generate a negative slope. In the cases where the external rotatable structure is freely rotating, the implementations described herein may enable determination of the correct position of the external rotatable structure. In some embodiments, a second auxiliary signal may be generated to enable correct determination of the angular position of the external rotatable structure. Multiple channels RVDTs or other types of rotary sensors may be utilized for redundancy purposes. The RVDT is, in some implementations, hermetically sealed, and a hydrostatic pneumatic or hydraulic pressure may be applied to the RVDT.

In some embodiments, an assembly to determine an angular position of a rotatable structure external to the assembly is provided. The assembly includes a sensor including a rotatable member, a main winding set, and at least one auxiliary winding, and a coupling element to couple the sensor to the external rotatable structure to cause rotation of the rotatable member of the sensor in response to rotation of the external rotatable structure. Resultant voltages at the main winding set and at the at least one auxiliary winding are produced based, at least in part, on an angular position of the rotatable member of the sensor. The angular position of the external rotatable structure is determined based on the resultant voltages at the main winding set and at the at least one auxiliary winding.

Embodiments of the assembly may include at least some of the features described in the present disclosure, including the following feature.

The angular position of the external rotatable structure may be determined based on values derived from the resultant voltages at the main winding set and at the at least one auxiliary winding.

In some embodiments, an assembly to determine an angular position of a rotatable structure external to the assembly is provided. The assembly includes a rotary variable differential transformer (RVDT) sensor including a rotatable shaft, at least one armature disposed on the rotatable shaft, a main primary winding proximate the rotatable shaft and at least one auxiliary primary winding proximate the rotatable shaft, and also a main secondary winding set proximate the rotatable shaft and at least one auxiliary secondary winding proximate the rotatable shaft. The assembly further includes an interfacing device coupled to the RVDT sensor, the interfacing device configured to engage the external rotatable structure such that rotation of the external rotatable structure will cause rotation of the rotatable shaft of the RVDT. The rotation of the rotatable shaft will cause resultant voltages at the main secondary winding set and at the at least one auxiliary secondary winding that are produced based on voltages applied to the main primary winding and to the at least one auxiliary primary winding, and further based on location of the at least one armature disposed on the rotatable shaft. The angular position of the external rotatable structure is determined based on the resultant voltages at the main secondary winding set and at the at least one auxiliary secondary winding.

Embodiments of the assembly may include at least some of features described in the present disclosure, including at least some of the features described above in relation to the first assembly, as well as one or more of the following features.

The angular position may be determined based on values derived from the resultant voltages at the main secondary winding set and at the at least one auxiliary secondary winding. The values derived from the resultant voltages at the main secondary winding set and at the at least one auxiliary secondary winding may include ratio values determined based on the resultant voltages at the main secondary winding set and at the at least one auxiliary secondary winding.

The voltages applied at the main primary winding and the at least one auxiliary winding may include A/C voltages.

The main primary winding and the at least one auxiliary primary winding may be located between the main secondary winding set and the at least one auxiliary secondary winding.

One or more of the main primary winding, the at least one auxiliary primary winding, the main secondary winding set, and/or the at least one auxiliary secondary winding may surround, at least in part, the rotatable shaft.

The interfacing device may include a flexible gear to resiliently engage the external rotatable structure.

The assembly may further include a support plate coupled to the flexible gear, the support plate configured to maintain the flexible gear in a two-dimensional plane to enable the flexible gear to resiliently flex only in the two-dimensional plane when the flexible gear is engaged to the external rotatable structure.

The main primary windings, the at least one main auxiliary winding, the main secondary winding set, and the at least one auxiliary secondary winding may be contained in a hermetically sealed winding cavity of the RVDT sensor.

The interfacing device may be configured to engage a rotatable nose wheel landing gear strut of an aircraft.

The main secondary winding set may be calibrated to produce main voltages representative of at least two possible corresponding angular positions of the external rotatable structure. A correct angular position of the external rotatable structure may be determined from the at least two possible angular positions corresponding to the main voltages produced at the main secondary winding based on an auxiliary voltage produced by the at least one auxiliary secondary winding.

The assembly may further include at least one power source to provide the voltages applied to the main primary winding and to the at least one auxiliary primary winding.

The main secondary winding set may include one or more of, for example, a tapped main secondary winding, and/or a pair of main secondary windings.

In some embodiments, a system to determine an angular position of a rotatable structure external to a rotary variable differential transformer (RVDT) sensor is provided. The system includes the rotary variable differential transformer (RVDT) sensor which includes a rotatable shaft, at least one armature disposed on the rotatable shaft, a main primary winding proximate the rotatable shaft and at least one auxiliary primary winding proximate the rotatable shaft, and also a main secondary winding set proximate the rotatable shaft and at least one auxiliary secondary winding proximate the rotatable shaft. The system further includes an interfacing device coupled to the RVDT sensor, the interfacing device configured to engage the external rotatable structure to cause rotation of the rotatable shaft of the RVDT sensor in response to rotation of the external rotatable structure, and a processing module to determine the angular position of the external rotatable structure based on voltages at the main secondary winding set and at the at least one auxiliary secondary winding resulting from the rotation of the rotatable shaft. The resultant voltages are produced based on voltages applied at the main primary winding and at the at least one auxiliary primary winding, and further based on location of the at least one armature disposed on the rotatable shaft.

Embodiments of the system may include at least some of the features described in the present disclosure, including at least some of the features described above in relation to the assemblies, as well as one or more of the following features.

The main secondary winding set may be calibrated to produce main voltages representative of at least two possible corresponding angular positions of the external rotatable structure. The processing module configured to determine the angular position may be configured to determine a correct angular position of the external rotatable structure from the at least two possible angular positions corresponding to the main voltages produced at the main secondary winding set based on an auxiliary voltage produced at the at least one auxiliary secondary winding.

In some embodiments, a method to determine an angular position of a rotatable structure external to a sensor coupled to the external rotatable structure is provided. The method includes measuring voltages induced in a main winding set and in at least one auxiliary winding of the sensor in response to rotation of the external rotatable structure. The resultant voltages are produced based, at least in part, on an angular position of a rotatable member of the sensor. Rotation of the rotatable member of the sensor is caused by the rotation of the external rotatable structure causes. The method also includes determining the angular position of the external rotatable structure based on the resultant voltages at the main winding set and at the at least one auxiliary winding.

Embodiments of the method system may include at least some of the features described in the present disclosure, including at least some of the features described above in relation to the assemblies and the system, as well as one or more of the following features described below.

Determining the angular position may include determining the angular position based on ratio values derived from the resultant voltages at the main winding set and at the at least one auxiliary winding.

Measuring the voltages induced in the main winding set and in the at least one auxiliary winding of the rotatable sensor may include measuring voltages resulting at a tapped main secondary winding of a rotary variable differential transformer (RVDT) sensor and in at least one auxiliary secondary winding of the RVDT sensor. The resultant voltages are produced based on one or more voltages applied at a main primary winding and in at least one auxiliary primary winding of the RVDT sensor, and further based on a location of at least one armature disposed on a rotatable shaft of the RVDT sensor.

The tapped secondary winding may be calibrated to produce main voltages representative of at least two possible corresponding angular positions of the external rotatable structure. Determining the angular position may include determining a correct angular position of the external rotatable structure from the at least two possible angular positions corresponding to the main voltages produced at the tapped main secondary winding based on an auxiliary voltage produced at the at least one auxiliary secondary winding.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Details of one or more implementations are set forth in the accompanying drawings and in the description below. Further features, aspects, and advantages will become apparent from the description, the drawings, and the claims.

BRIEF DESCRIPTION OF THE FIGURES

Like reference symbols in the various drawings indicate like elements.

DETAILED DESCRIPTION

Figure 1A:
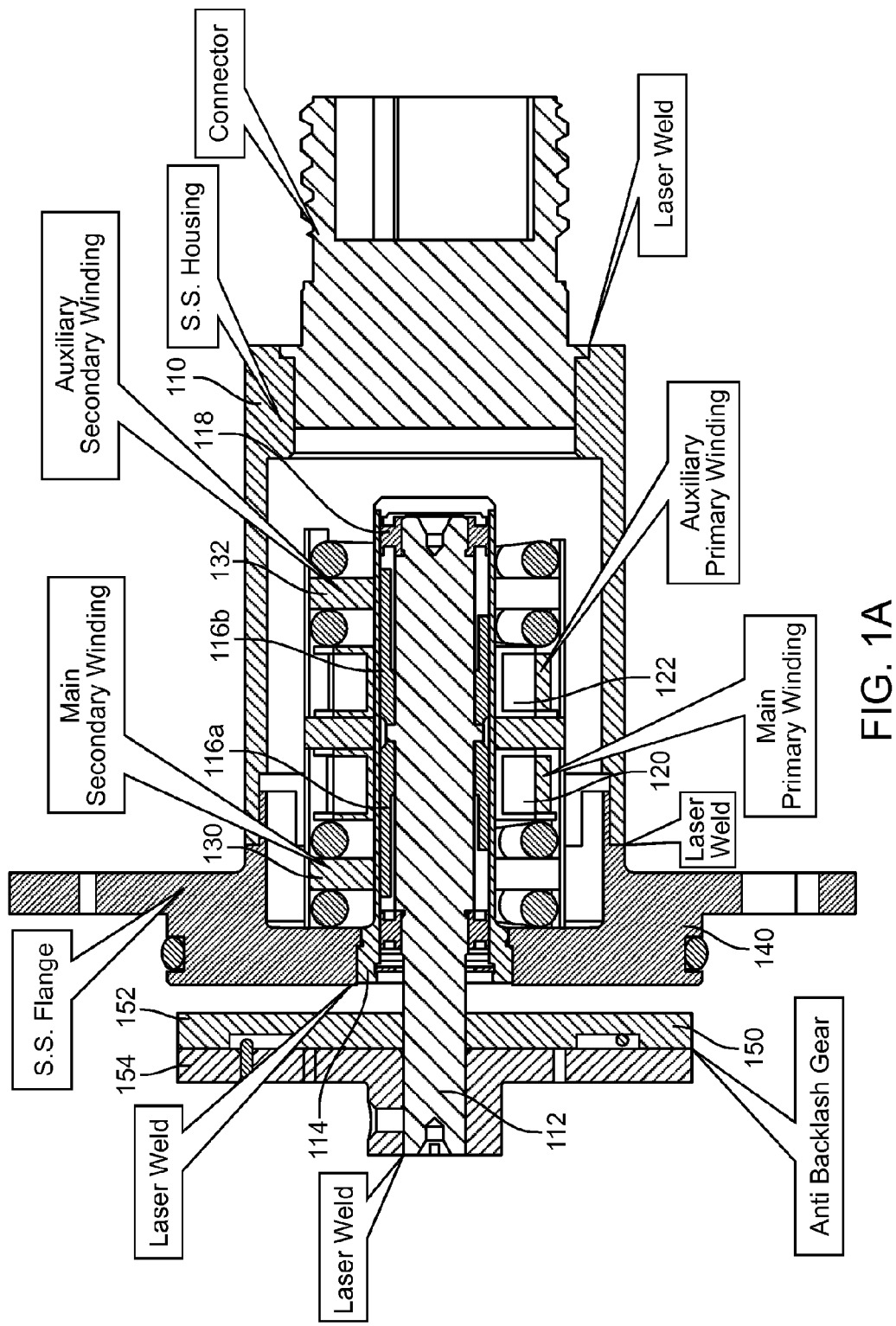
FIG. 1A is a cross-sectional diagram of an example embodiment of a sensor assembly to determine an angular position of an external rotatable structure.

Disclosed herein are assemblies, systems, devices and methods, including an assembly to determine an angular position of rotatable structure external to the assembly. The assembly includes a sensor including a rotatable member and a main winding set and at least one auxiliary winding, and a coupling element to couple the sensor to the external rotatable structure such that rotation of the external rotatable structure will cause rotation of the rotatable member of the sensor resulting. The rotation of the rotatable member will cause resultant output voltages at the main winding set (which may be tapped to cause two output voltages to form, or which may include two or more windings) and at the at least one auxiliary winding. The resultant voltages at the main winding set and the resultant voltage at the least one auxiliary winding are produced based, at least in part, on an angular position of the rotatable member of the sensor, with the angular position of the external rotatable structure determined based on the resultant voltages at the main winding set and the resultant voltage at the at least one auxiliary winding.

In some implementations, an assembly to determine an angular position of an external rotatable structure is provided that includes a rotary variable differential transformer (RVDT) sensor including a rotatable shaft, at least one armature disposed on the rotatable shaft, a main primary winding proximate the rotatable shaft and at least one auxiliary primary winding proximate the rotatable shaft, and a main secondary winding set proximate the rotatable shaft and at least one auxiliary secondary winding proximate the rotatable shaft. The assembly further includes an interfacing device coupled to the RVDT sensor, with the interfacing device configured to engage the external rotatable structure to cause rotation of the rotatable shaft of the RVDT sensor in response to rotation of the external rotatable structure. The rotation of the rotatable shaft will cause resultant voltages at the main secondary winding set and at the at least one auxiliary secondary winding. The resultant voltages produced based on voltages applied to the main primary winding and to the at least one auxiliary primary winding, and further based on location of the at least one armature disposed on the rotatable shaft, with the angular position of the external rotatable structure determined based on the resultant voltages at main secondary winding set and at the at least one auxiliary secondary winding. In some embodiments, the main secondary winding set is calibrated to produce main voltages representative of at least two possible corresponding angular positions of the external rotatable structure. A correct angular position of the external rotatable structure may be determined from the at least two possible angular positions corresponding to the main voltages produced at the main secondary winding set based on an auxiliary voltage produced by the at least one auxiliary secondary winding.

Figure 1B:
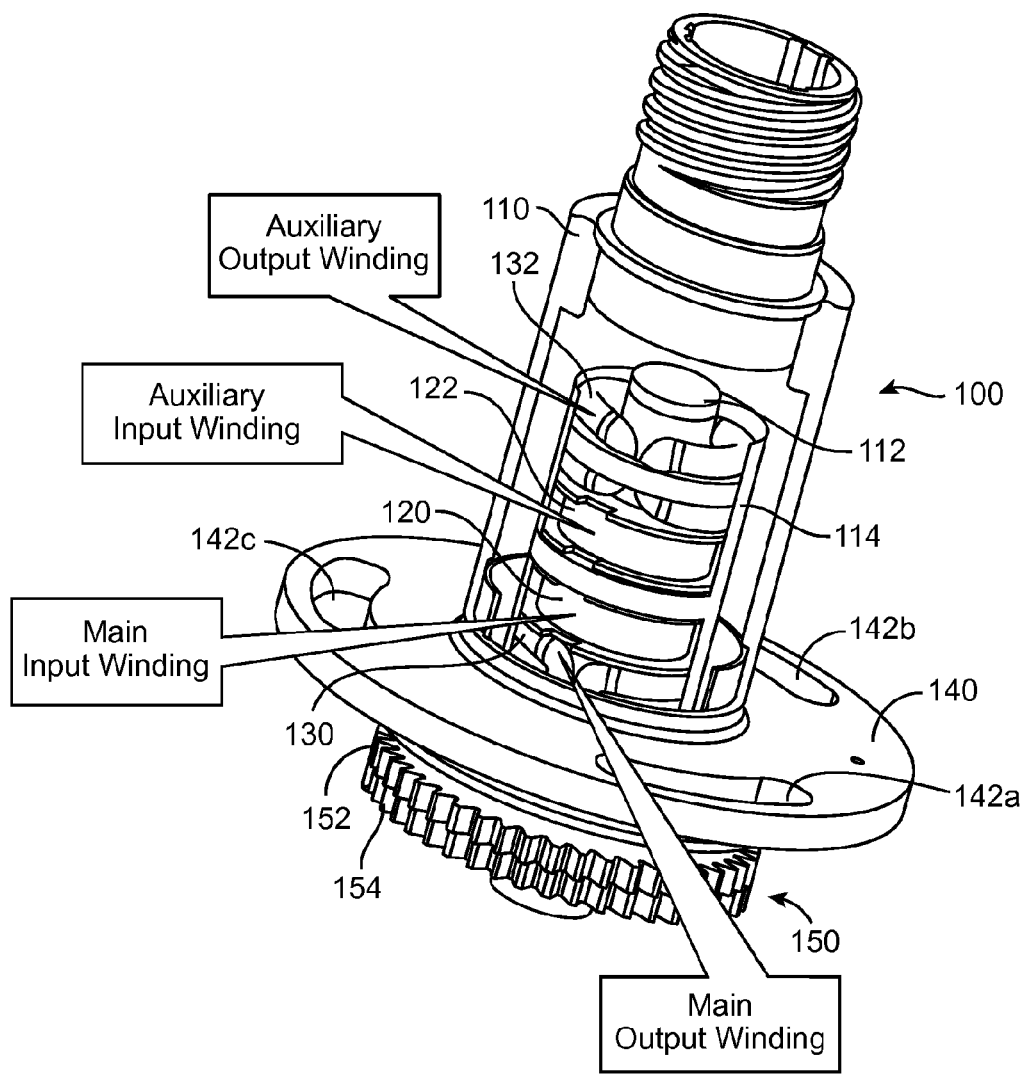
FIG. 1B is a partial perspective diagram of the example assembly of FIG. 1A.

FIG. 1A is a cross-sectional diagram of an example embodiment of a sensor assembly 100, configured to determine an angular position of an external rotatable structure (e.g., a nose wheel of a landing gear of an aircraft). FIG. 1B is a perspective diagram of the example assembly 100 where, for the purpose of illustration, a portion of the walls of the assembly has not been included, to thus show the interior of the assembly.

The sensor assembly 100 may implement, in some embodiments, a rotary variable differential transformer (RVDT) sensor that includes a rotatable member, such as a rotatable shaft 112, that is configured to rotate in an inner volume of a tube (also referred to as an isolation tube) 114 placed inside the inner volume of a housing 110. In some embodiments, the housing 110 may be constructed from stainless steel. Other suitable materials may be used. A bearing 118 may be coupled to the shaft at substantially proximate the shaft's end placed inside the housing 110.

Rotation of the rotatable shaft 112 is caused by rotational movement of the external rotatable structure which actuates, in some implementations, a coupling element (e.g., an interfacing device or member) that in turn causes rotation of the rotatable shaft of the assembly 100 (e.g., via another gear of the assembly 100, such as the anti-backlash gear 150 depicted in FIG. 1A). As further shown in FIG. 1A, the RVDT sensor assembly also includes a main primary winding (also referred to as a main input winding) 120 proximate the rotatable shaft and at least one auxiliary primary winding (also referred to as an auxiliary input winding) 122 proximate the rotatable shaft. The RVDT sensor assembly 100 further includes a set of main secondary windings (also referred to as main output windings) 130 proximate the rotatable shaft 112, which in some embodiments may be a single main secondary winding which may be tapped (e.g., tapped winding 200 shown in FIG. 2), a pair of main secondary windings, or more than two main secondary windings. The RVDT sensor assembly 100 also includes at least one auxiliary secondary winding (also referred to as an auxiliary output winding) 132 proximate the rotatable shaft 112. The windings of the RVDT sensor assembly 100 may be included in a laminated stator constructed, for example, from a nickel-iron alloy.

Figure 1C:
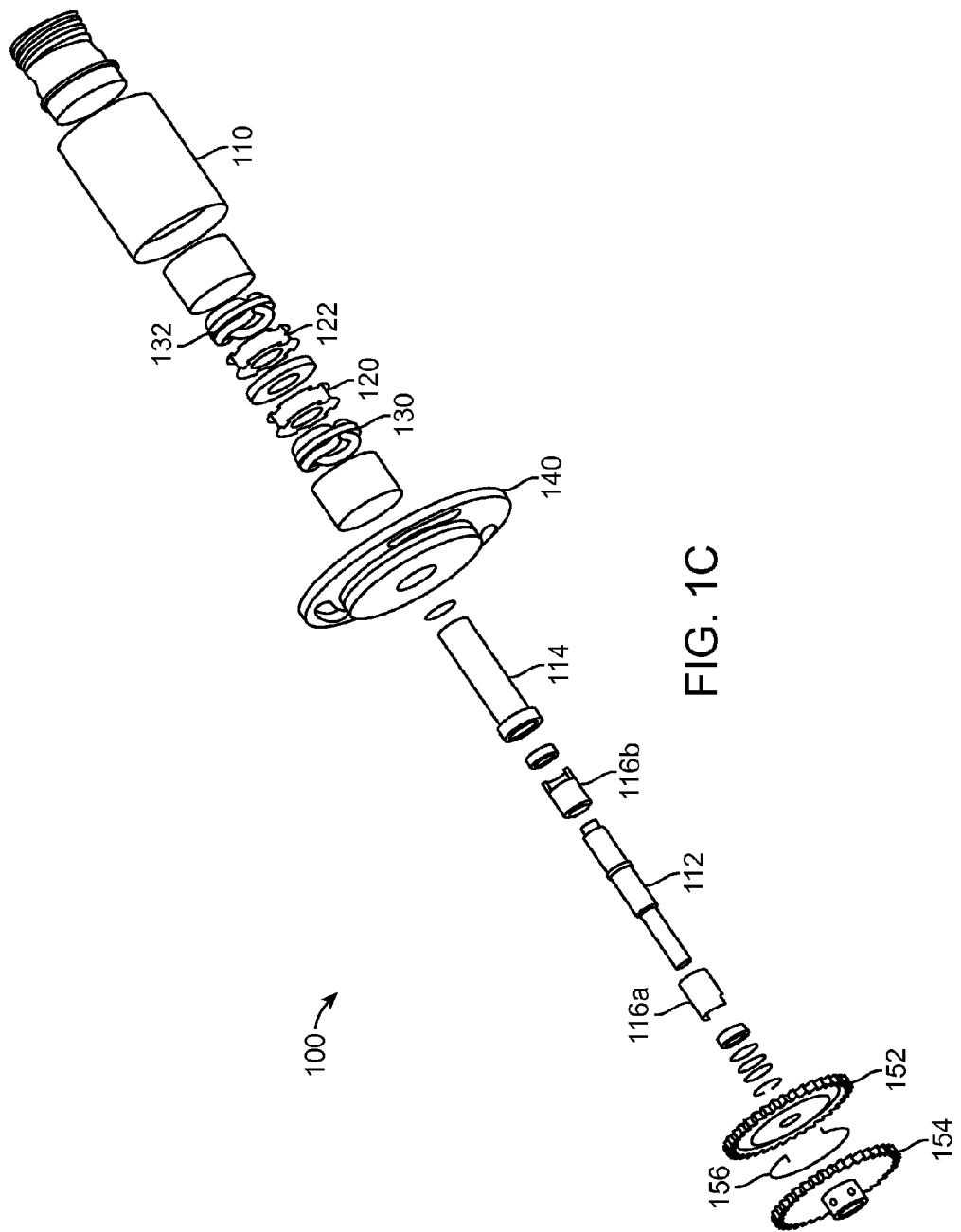
FIG. 1C is an exploded view of the assembly of FIG. 1A.

As further shown in FIGS. 1A and 1B, disposed on the outer surface of the rotatable shaft 112 is at least one armature (in the example embodiment of FIG. 1, two armatures 116a and 116b are depicted) that rotates with rotation of the rotatable shaft 112. The armatures 116a and 116b are constructed from a solid magnetic material (e.g., iron-nickel) that may be highly permeable, and may be welded or bonded to the rotatable shaft 112, or may be secured to the rotatable shaft 112 in some other suitable way.

When voltage (e.g., AC voltage) is applied to the main primary winding 120 and the at least auxiliary primary winding 122 (power source to apply the excitation voltages on the primary windings is not shown in FIGS. 1A and 1B), resultant voltages will be induced/produced at the set of the main secondary winding 130 and at the at least one auxiliary secondary winding 132. Because the armatures secured to the rotatable shaft 112 change the inductance (or directs flux onto each secondary winding) of the windings as the armatures rotate, the voltage level at the set of the main secondary winding and the at least one auxiliary secondary winding will vary and be based, at least in part, on the position of the armatures 116a and 116b. Thus, the voltages produces at the secondary windings (the main set and the at least one auxiliary set) will be indicative of the angular position of the armature(s) disposed on the rotatable shaft of the RVDT sensor, and therefore be indicative of the angular position of the rotatable external structure that causes rotation of the rotatable shaft 112 (e.g., via an interfacing device and/or other gears).

Figure 2:
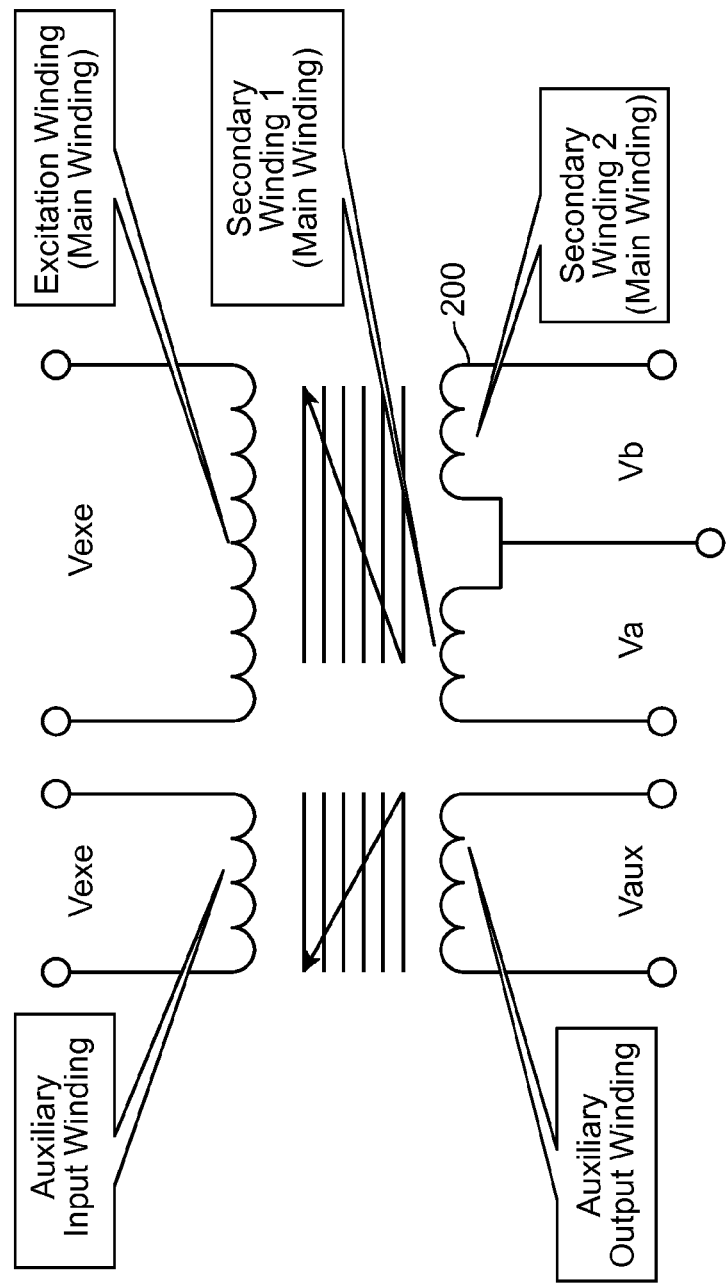
FIG. 2 is a diagram of a winding configuration that includes a tapped secondary (output) winding.

For example, in some implementations, a tapped secondary winding 200 may be used, where the two voltages formed at the tapped secondary winding, $V_a$ and $V_b$ (as also shown in FIG. 2) may vary with the angular position (denoted as the angle θ) according to a relationship such as:

$$\frac{Va - Vb}{Va + Vb} \bigg/ G \qquad \text{(Equation 1)}$$

where G is a gain or sensitivity parameter (in unit volt/volt/degree).

The output ratio of Equation 1, which is derived from voltages at the main secondary winding, can be used to determine the angular position θ of the rotatable shaft because as the rotatable shaft 112 (shown in FIG. 1A) rotates, the armatures (116a and 116b in the example embodiment of FIG. 1A) will also rotate, and as a result the ratio of the voltage difference-over-sum $(V_a-V_b)/(Va+Vb)$ will vary in accordance with the angular position θ.

Figure 3A:
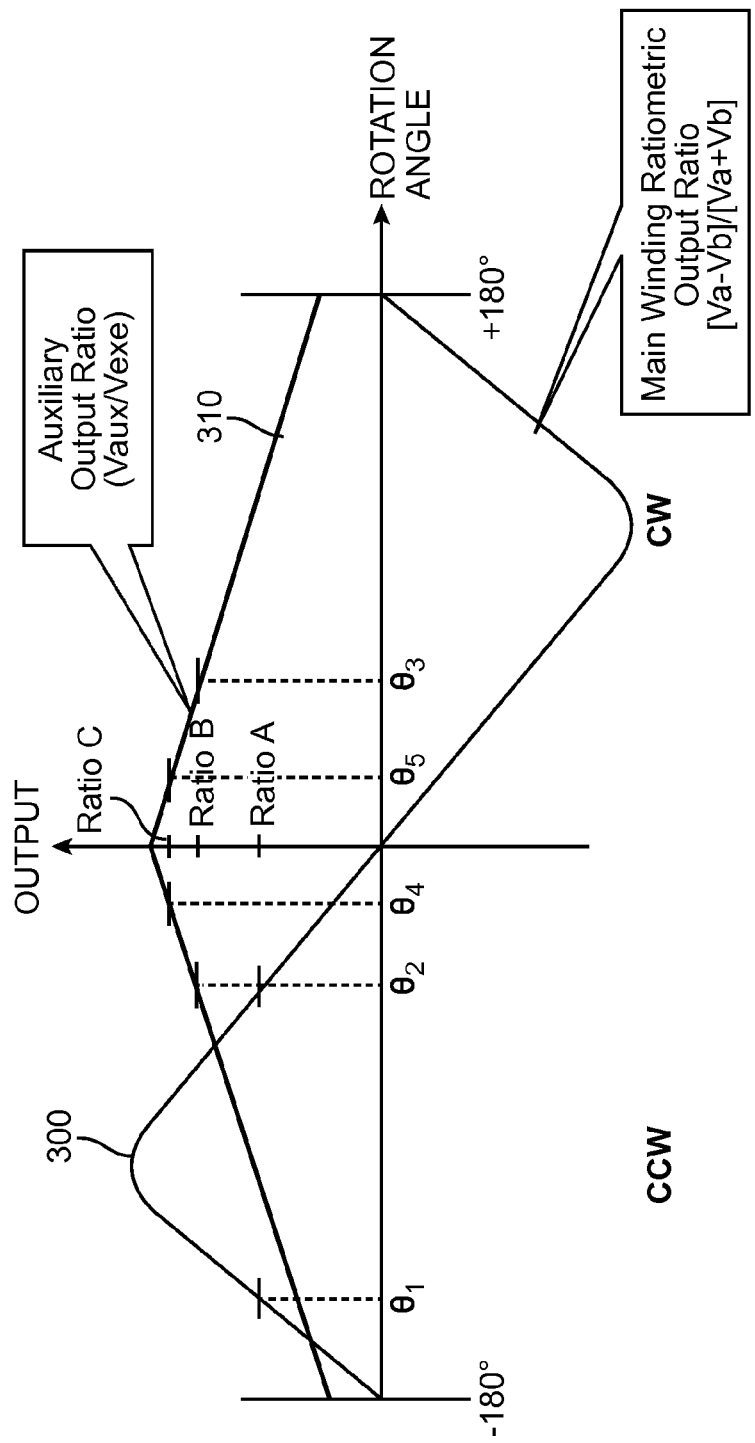
FIG. 3A is a graph including plots of relationships between voltage-based values determined for main and auxiliary secondary windings, and corresponding determined angular positions.
Figure 3B:
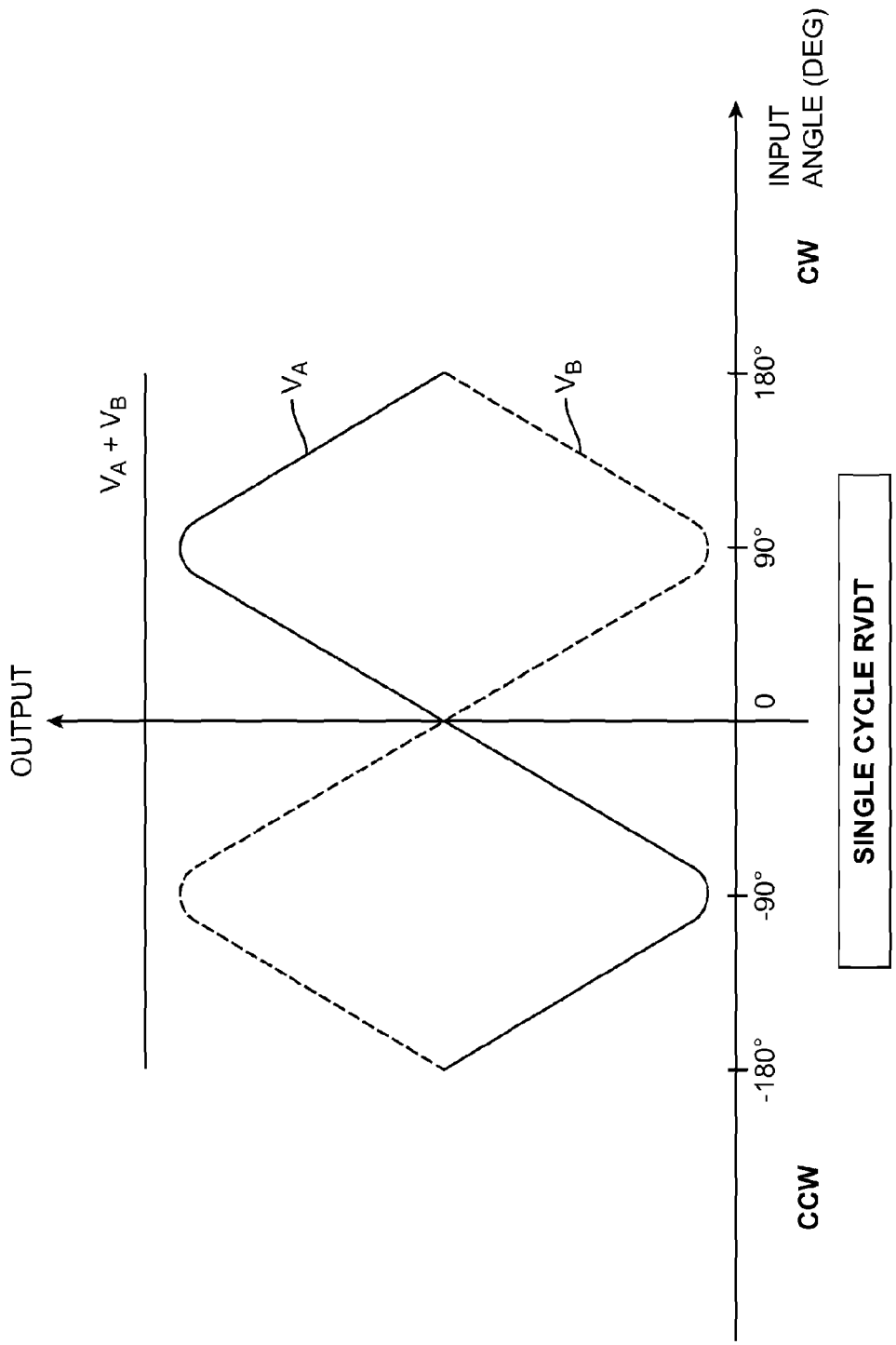
FIG. 3B is a graph showing the individual behavior of the voltages at the main secondary windings.

With reference now to FIG. 3A, a graph that includes a plot 300 of a rotation angle θ versus a difference-over-sum ratio value (such as the ratio value of Equation 1) derived from the voltages at the set of main secondary winding(s) (e.g., the voltages $V_a$ and $V_b$ of the tapped secondary winding) is shown. FIG. 3B is a graph showing the individual behavior of the voltages $V_a$ and $V_b$, and of the voltage sum $V_a+V_b$ (which, in the depicted embodiments, has a constant value). In some embodiments, other types of values that are representative of, or are derived from, the voltages at the set of main secondary winding(s) may also be used. As shown in FIG. 3A, the ratio value determined from the voltages $V_a$ and $V_b$ of the secondary winding corresponds, in some embodiments, to at least two different possible rotational angles. For example, the ratio value Ratio A corresponds, in the plot 300, to angle $\theta_1$ and to angle $\theta_2$. Thus, determination of the ratio value resulting from the particular angular position of the rotatable member of the assembly (e.g., the rotatable shaft 112) corresponds to two possible angles.

Therefore, in some implementations, a measure that is representative of, or is derived from, the resultant voltage at the auxiliary secondary winding may be used to resolve this ambiguity as to the correct angular position of the rotatable shaft 112. Particularly, the output voltage of the auxiliary secondary winding, resulting from the excitation voltage applied at the auxiliary primary winding (e.g., the winding 122 of FIG. 1A) also varies based on the angular position of the rotatable shaft (due to the rotation of the at least one armature). The variation of the resultant voltages of the auxiliary secondary winding may be represented using some other value, such as an auxiliary ratio value shown in FIG. 3A of $V_{aux}/V_{exe}$. Other relationships or formulas to represent the voltage behavior at the at least one auxiliary secondary winding of the RVDT sensor assembly 100 may be used.

As further shown in FIG. 3A, the relationship between the auxiliary output ratio value $V_{aux}/V_{exe}$ and the angular position of the rotatable shaft, marked as plot 310, is such that a particular determined auxiliary ratio value may correspond to two different possible angular positions. However, because the behavior of the relationship between the auxiliary ratio value and the angular position of the rotatable shaft is generally different from the behavior of the relationship between the main winding ratio value and angular position of the rotatable shaft, the auxiliary ratio determined when the rotatable shaft is at some particular angular position can be used to select the correct one of the two possible angular positions corresponding to the main secondary winding ratio. Thus, in the example of FIG. 3A, an auxiliary ratio, denoted in the graph of FIG. 3A as Ratio B, is determined when the shaft is at an angular position that produced Ratio A (corresponding to the resultant voltages $V_a$ and $V_b$ of the main secondary windings). As shown in the plot 310, Ratio B corresponds to two different angular positions, namely, $\theta_2$ and $\theta_3$. Accordingly, because the angular position common to the plots 300 and 310 of FIG. 3A is the angle $\theta_2$, this angle is determined to be the correct angular position of the rotatable shaft of the assembly 100. In some embodiments, determining the angles corresponding to the voltages measured (or otherwise determined) at the main secondary winding(s) and the auxiliary secondary winding may be performed using, for example, a lookup table, by computing the angles using a derived mathematical relationship relating voltages to angles (such derivation may be performed, for example, using any one of various mathematical regression techniques), etc.

In some implementations, the main secondary winding set, from which the voltages $V_a$ and $V_b$ resulting from applying an excitation voltage at the main primary winding are produced, may be calibrated to establish a relationship between the angular position of the rotatable shaft 112 and the voltages $V_a$ and $V_b$ (and, therefore, between the shaft's angular position and the particular value determined from the voltages $V_a$ and $V_b$). On the other hand, the voltages produced at the auxiliary secondary winding need not be calibrated. Rather, it is sufficient that the auxiliary secondary voltage (or a representative/derived value thereof) can be matched to the correct one of the two possible angular positions corresponding to the representative value produced by the main secondary winding. For example, and with reference again to FIG. 3A, in some embodiments, a ratio value marked as Ratio C may be determined for the auxiliary secondary winding when the rotatable shaft 112 is an angular position that resulted in Ratio A. As shown in the plot 310, Ratio C may be correspond to angles $\theta_4$ and $\theta_5$, and thus does not share a common angle with the angles corresponding to the Ratio A determined for the main secondary winding. However, a pre-determined relationship between the correct angle of the rotatable shaft, the ratio determined for the main secondary winding(s), and the ratio determined for the auxiliary secondary winding may be established (e.g., through testing performed prior to operational use of the assembly 100 of FIG. 1A) through which the correct angle ($\theta_{correct}$) may be determined based on the determined ratios for the main secondary windings and the auxiliary secondary winding. For example, when the values of Ratio A and Ratio C are determined for the main secondary windings and the auxiliary secondary winding for a particular angular position of the rotatable shaft 112, a determination may be made (e.g., using a lookup table, or using any other technique) that the correct position of the rotatable shaft 112 is $\theta_1$.

With the correct angular position of the external rotatable structure determined, the external rotatable structure may be actuated (e.g., via a feedback mechanism) to rotate to a required or desirable position. For example, in implementations in which the RVDT sensor assembly is used to determine the angular position of the wheels of the nose wheel landing gear of an air craft, a determination that, during landing, the wheels are not oriented substantially parallel to the longitudinal axis of the fuselage (or the landing strip) may be used to cause actuation of the gears controlling the wheel (as will be described in greater details below) to cause the wheel to be properly aligned for landing.

Turning back to FIGS. 1A and 1B, the main input (primary) winding 120 and at least one auxiliary input (primary) winding 122, as well as a main output (secondary) winding 130 and at least one auxiliary winding 132 are positioned proximate the rotatable shaft 112. In the example embodiment of the assembly 100, the windings are positioned externally to the tube 114 in which the rotatable shaft 112 is configured to rotate, and thus are placed in a cavity that is defined by the internal walls of the housing 110 and the isolation tube 114. The cavity containing the windings (referred to as a cavity winding) is structured to be hermetically sealed to prevent (or at least reduce) moisture and/or environmental contaminants from entering or permeating into the winding cavity. The use of a hermetically sealed winding cavity can thus extend the projected life of the RVDT sensor assembly 100. The isolation tube 114 is constructed, in some embodiments, from non-permeable material such as 300 series stainless steel or Inconel. The material of the isolation tube generally a non-magnetic material (e.g., 360 series stainless steel) that enables the armature(s) on the rotatable shaft to vary the voltages produced on the secondary windings. In some embodiments, the main primary winding and the at least one auxiliary primary winding are located between the main secondary winding and the at least one auxiliary secondary winding. In some embodiments, at least one of the main primary winding, the at least one auxiliary primary winding, the main secondary winding set, and the at least one auxiliary secondary winding surrounds, at least in part, the rotatable shaft 112.

As further shown in FIGS. 1A and 1B, the assembly 100 includes a flange 140 that is coupled (e.g., welded, or otherwise secured) to the RVDT sensor assembly 100. The flange 140 may define an opening through which the housing of the RVDT sensor assembly is fitted, and then welded to. The flange 140 is used as a base structure to which the housing 110 of the assembly 100 is mounted, and thus provides structural support to the RVDT sensor assembly 100. As depicted in FIG. 1B, the flange 140 may also include one or more slots, such as the slots 142a-c, that extend from one surface of the flange 140 to its other surface, and which may be used to mount the assembly 100 (e.g., using screws or other suitable fastening devices) to a gear box assembly that includes an interfacing device that engages an external rotatable structure whose angular position is to be determined by the RVDT sensor. Also coupled to the shaft 112 of the sensor assembly 100 is an anti-backlash gear assembly 150 that may include, in some implementations, two gears 152 and 154 that may be coupled to each other using, for example, a C-spring (such as the spring 156 shown in the exploded view of FIG. 1C). The anti-backlash gear 150 is configured to engage one or more gears of the interfacing device and to be actuated by such one or more gears. Rotational torque produced by the rotatable external structure can thus be transferred to the sensor assembly 100 through the interfacing device engaging the anti-backlash gear 150 of the assembly 100.

As noted, an assembly including an RVDT sensor assembly (such as the sensor assembly 100) is configured to determine the angular position of an external rotatable structure, such as, for example, the nose wheel of a landing gear of an aircraft. Thus, with reference to FIG. 4A, a diagram depicting an example embodiment of an assembly 400 that includes an RVDT sensor assembly 410 (which may be similar to the assembly 100 of FIGS. 1A and 1B), and an interfacing device 420 that is secured to a nose wheel strut 430 that controls the nose wheel, is shown. Although FIG. 4A depicts the assembly 400 secured to a nose wheel strut (or column), other types of rotatable structures, whose angular positions may be determined using the RVDT sensor assembly described herein, may be used.

Figure 4A:
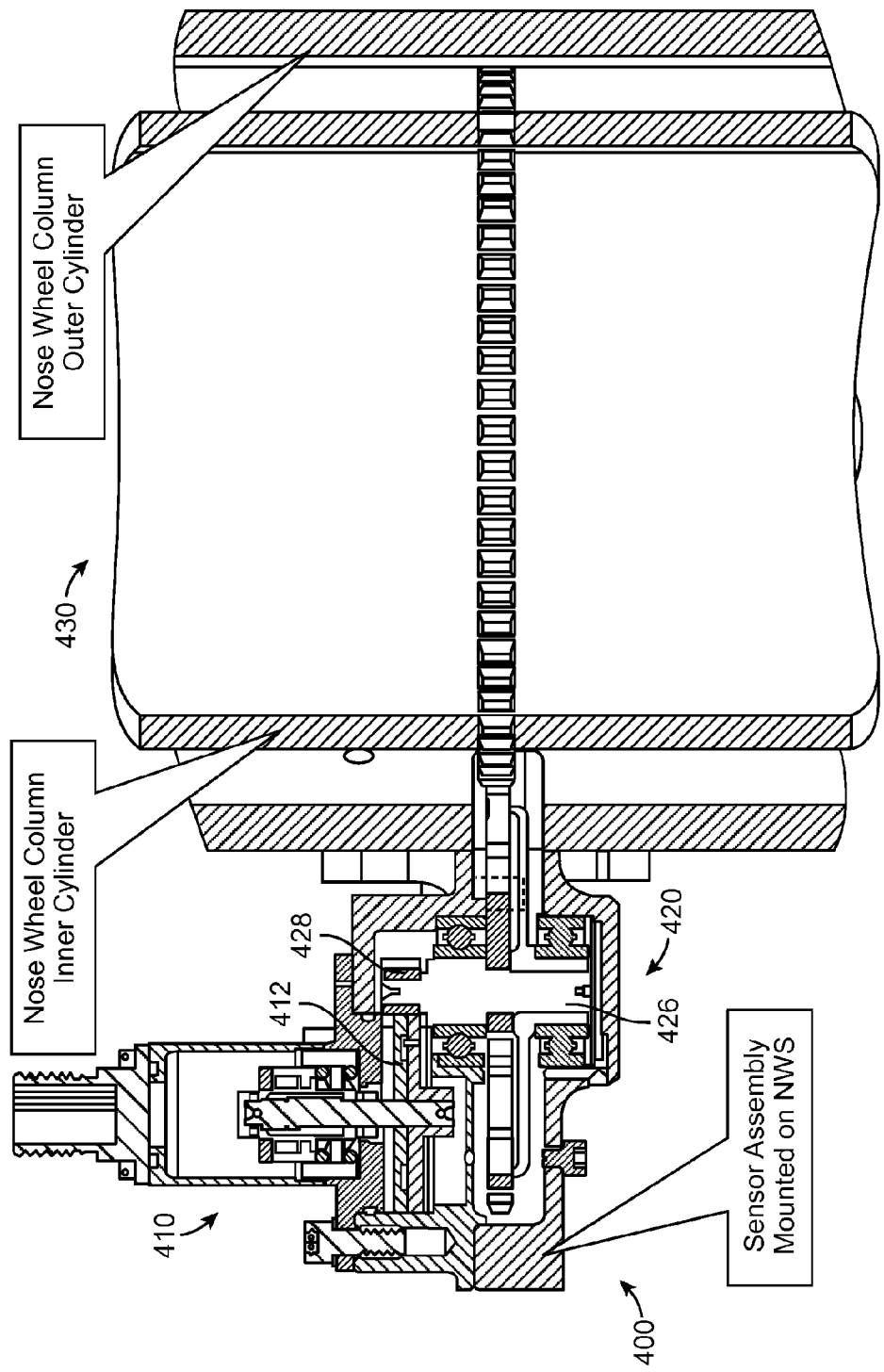
FIG. 4A is a diagram depicting an example embodiment of an assembly that includes an RVDT sensor assembly, an interfacing device, and an external rotatable structure.
Figure 5A:
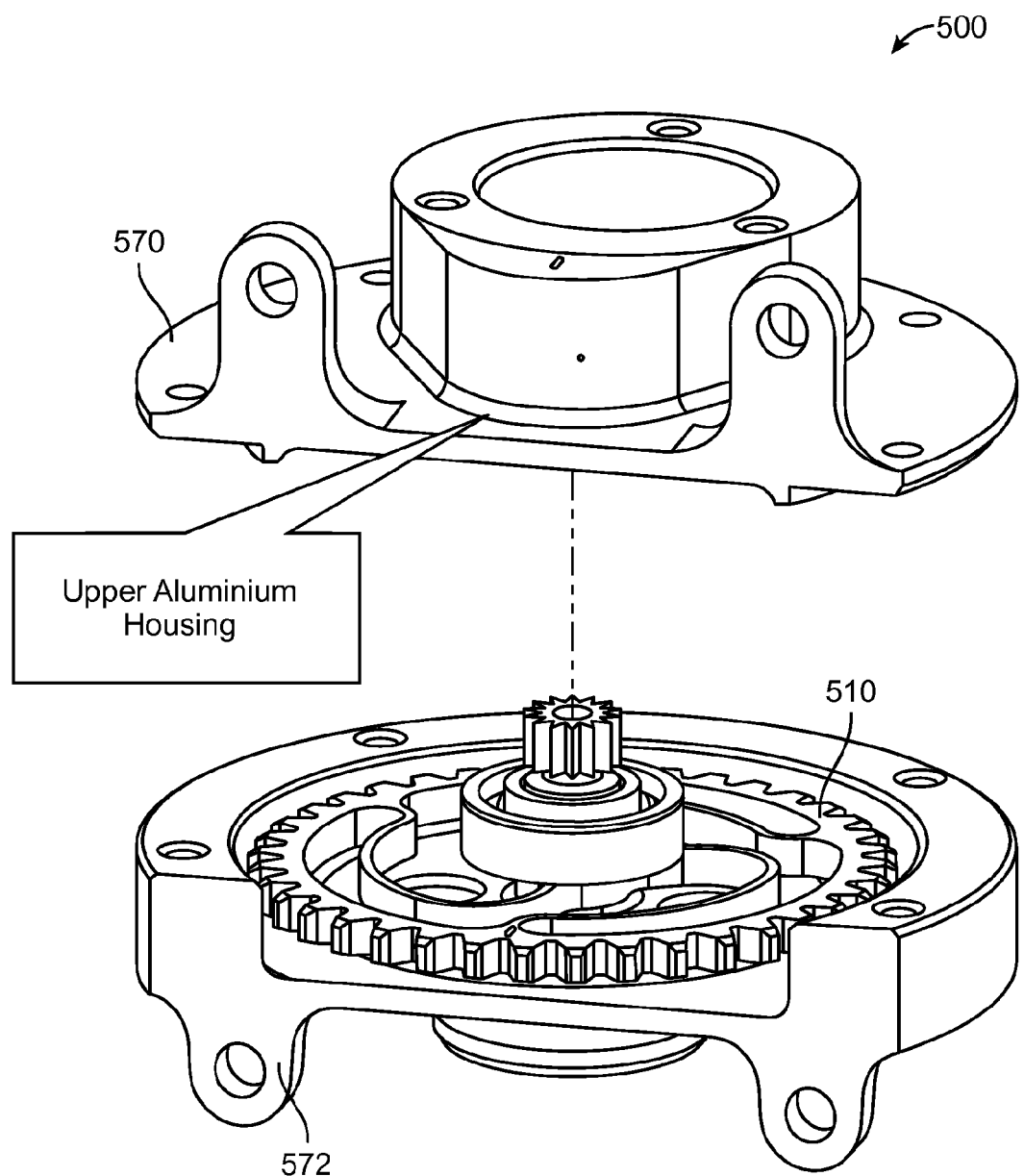
FIGS. 5A-I are views and diagrams of an example interfacing device configured to be coupled to an RVDT sensor assembly and to an external rotatable structure.
Figure 5B:
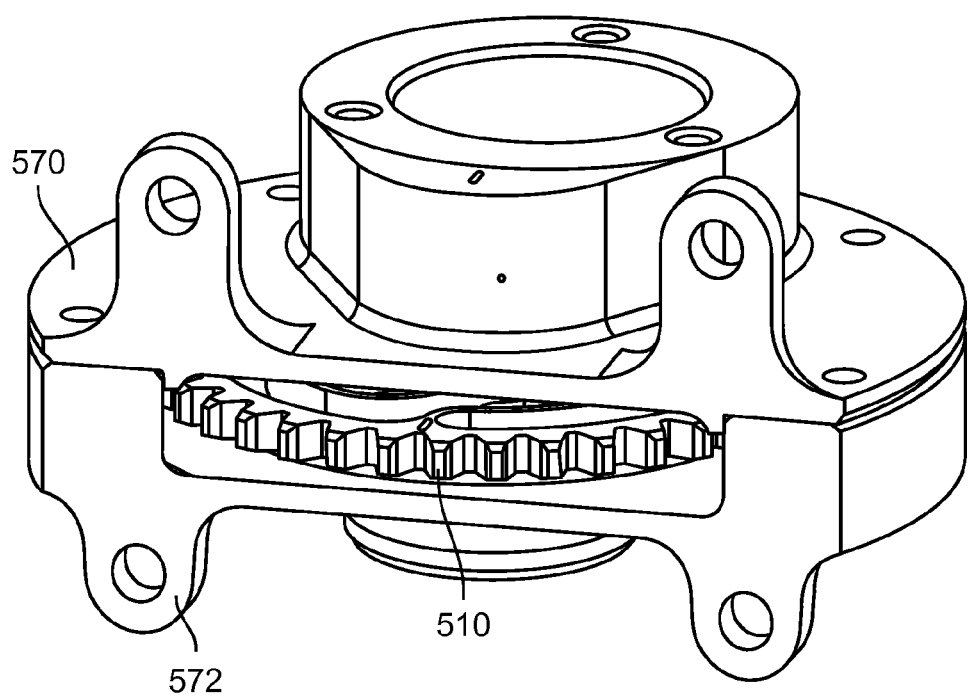

FIGS. 5A and 5B are perspective diagrams of an interfacing device 500 (also referred to as a gear box assembly), which may be similar to the interfacing device 420 of FIG. 4A, configured to interface between a rotatable structure (such as the structure 430 of FIG. 4A) and an RVDT sensor assembly (such as the assembly 100 of FIG. 1 or the assembly 410 of FIG. 4A). The interfacing device 500 includes a flexible gear 510 that engages and is actuated by an external gear (for example, a complementary gear of the external rotatable structure). The flexible gear 510 is configured to resiliently engage the external rotatable structure such that flexible gear 510 can bend or contort to some extent due to its contact with the external rotatable structure, and return to its regular non-bent state without sustaining any permanent damage or yielding to its structural integrity. The flexible gear can also compensate for eccentricities of the rotatable gear of the external structure (e.g., within +/−1 mm). The flexible gear 510, also shown in FIG. 5C, includes an exterior ring 512 with a plurality of cogs, and a plurality of flexible ribs 514 extending inwardly from the ring 512 (e.g., extending towards a hub, or a central ring such as a ring 516 shown in FIG. 5C). The flexible ribs 514 are configured to bend inward when force is applied to the flexible gear 510, e.g., when tension force is applied to the flexible gear 510 by a gear of the external rotatable structure.

Figure 5C:
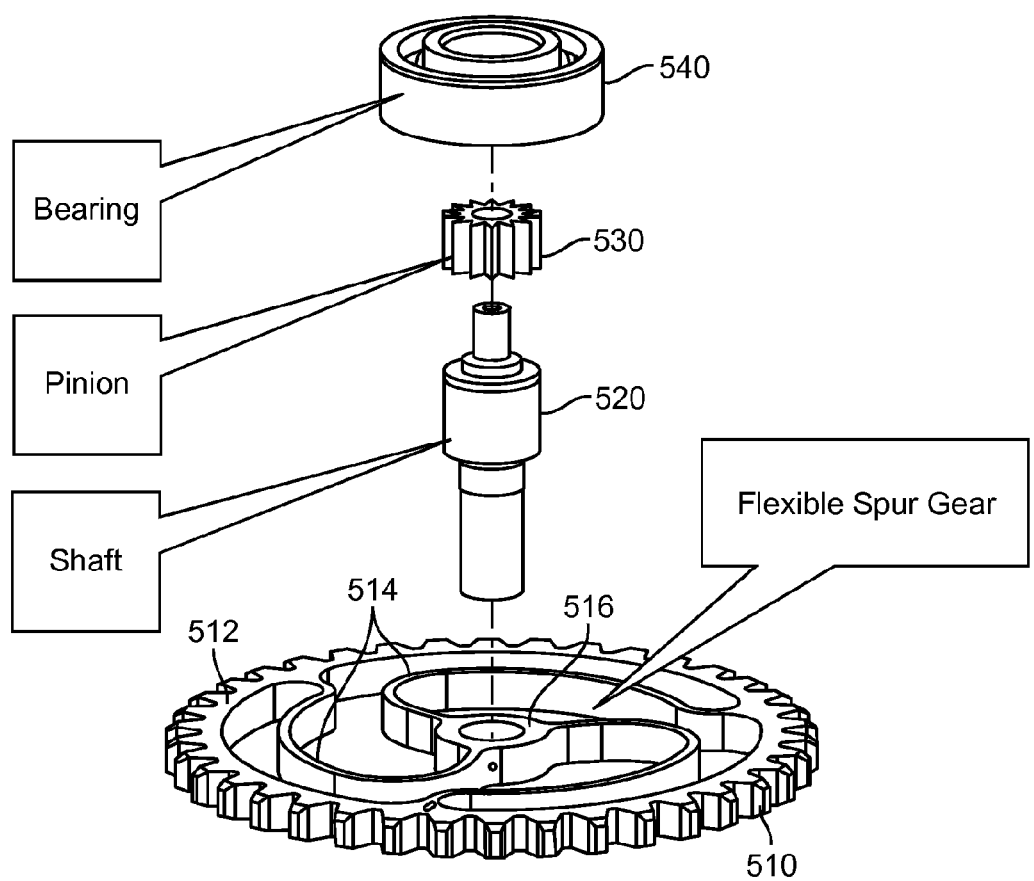
Figure 5D:
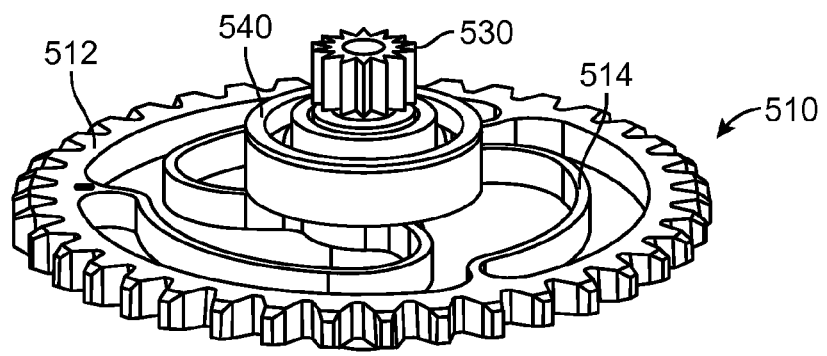

As further shown in FIG. 5C, the interfacing device also includes a shaft 520 configured to be received in the internal opening defined by the ring 516 of the flexible gear 510. Fitted on an opposite end of the shaft 520 (the end of the shaft not received by the ring 516) are a pinion 530 and a bearing 540. A diagram of the assembled flexible gear 510, the shaft 520, the pinion 530 and the bearing 540 is shown in FIG. 5D. The pinion 530 is configured to engage a sensor assembly, such as the assemblies 100 or 410 of FIG. 1A and FIG. 4A, respectively, to transfer rotational torque to the assembly 100. For example, in some embodiments, the pinion 540 (also depicted in FIG. 4A, and marked as pinion 428 of the interfacing device 420) is configured to engage the anti-backlash gear (marked as 412 in FIG. 4A) of the sensor assembly 410 to cause rotation of the anti-backlash gear (and thus of the rotatable shaft of the RVDT sensor) when the flexible gear of the interfacing device is actuated by the external rotatable structure (e.g., the structure 430 of FIG. 4A).

Figure 5E:
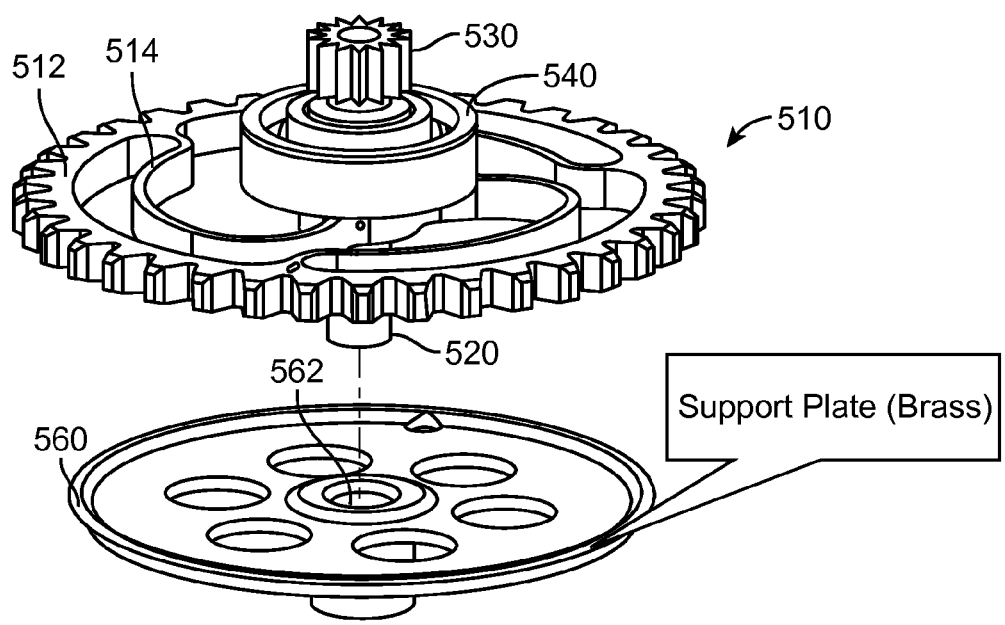

In some implementations, a support plate, such as a brass support plate 560 (shown, for example, in FIG. 5E), may be coupled to the flexible gear by fitting the shaft 520 coupled to the flexible gear 510 through an opening 562 defined in the brass plate 560. The support plate 560 is configured to maintain the flexible gear 510 in a two-dimensional plane to enable the flexible gear to resiliently flex substantially only in the two-dimensional plane when the flexible gear is engaged to the external rotatable structure.

Figure 5F:
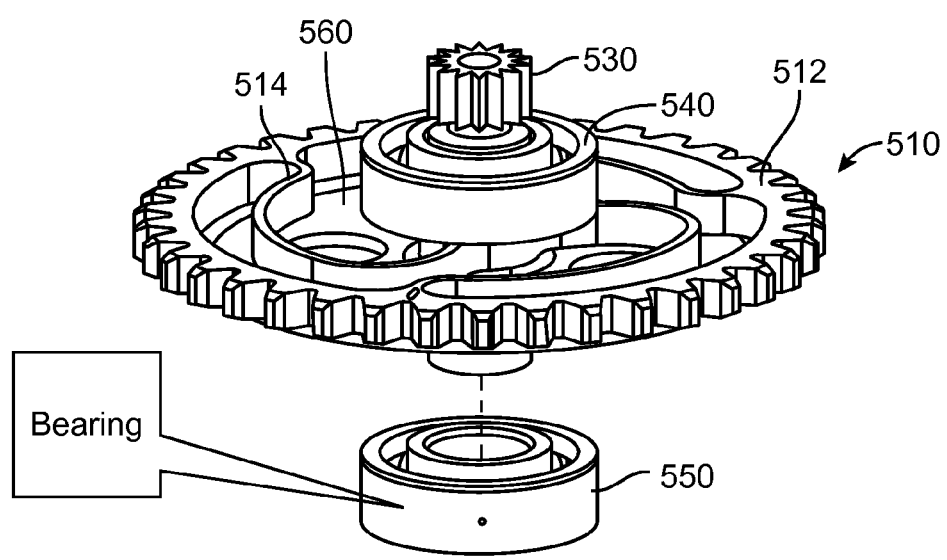
Figure 5G:
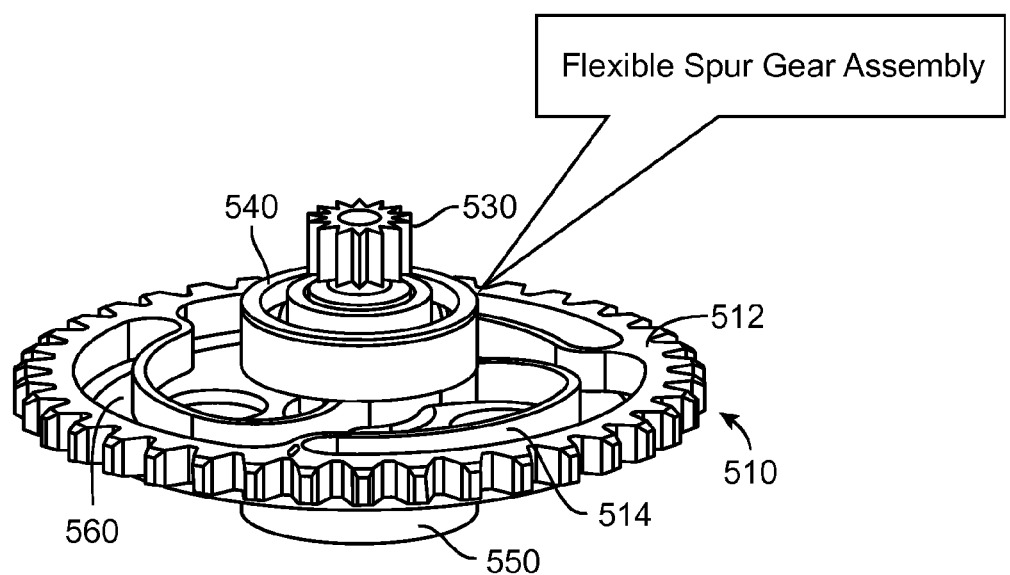

As depicted in FIG. 5F, showing another diagram of a portion of the interfacing device, another bearing 550 may be fitted to the end of the shaft 520 received through the internal ring of the flexible gear 510 (the central ring 516 in FIG. 5C). The assembled flexible gear assembly is depicted in FIG. 5G.

Figure 5H:
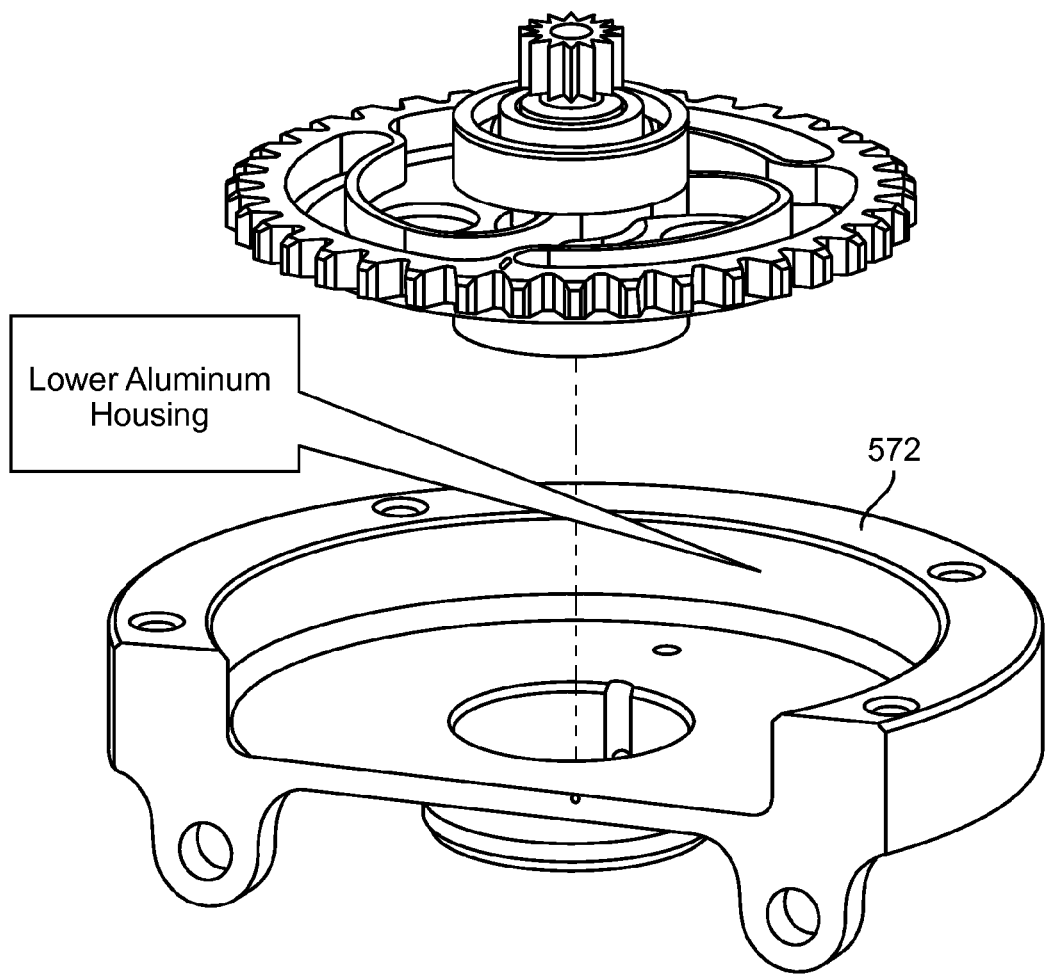
Figure 5I:
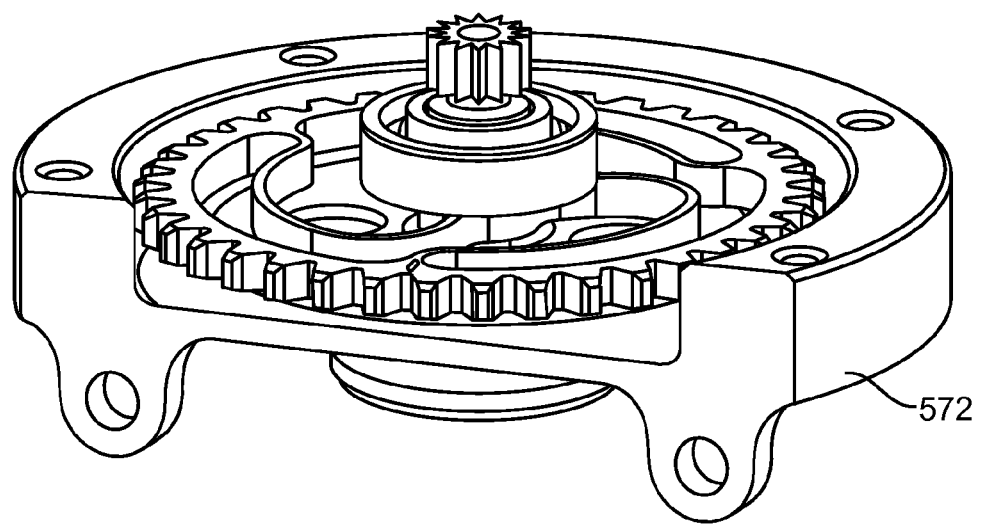

With reference again to FIGS. 5A and 5B, and to FIGS. 5H and 5I, the flexible gear 510, the shaft 520, and the pinion 530 are housed in an housing, such as the housing assembled from upper housing portion 570 and lower housing portion 572. In some embodiments, the upper and lower portions of the gear box housing may be constructed from aluminum, but other suitable materials may be used.

Figure 4B:
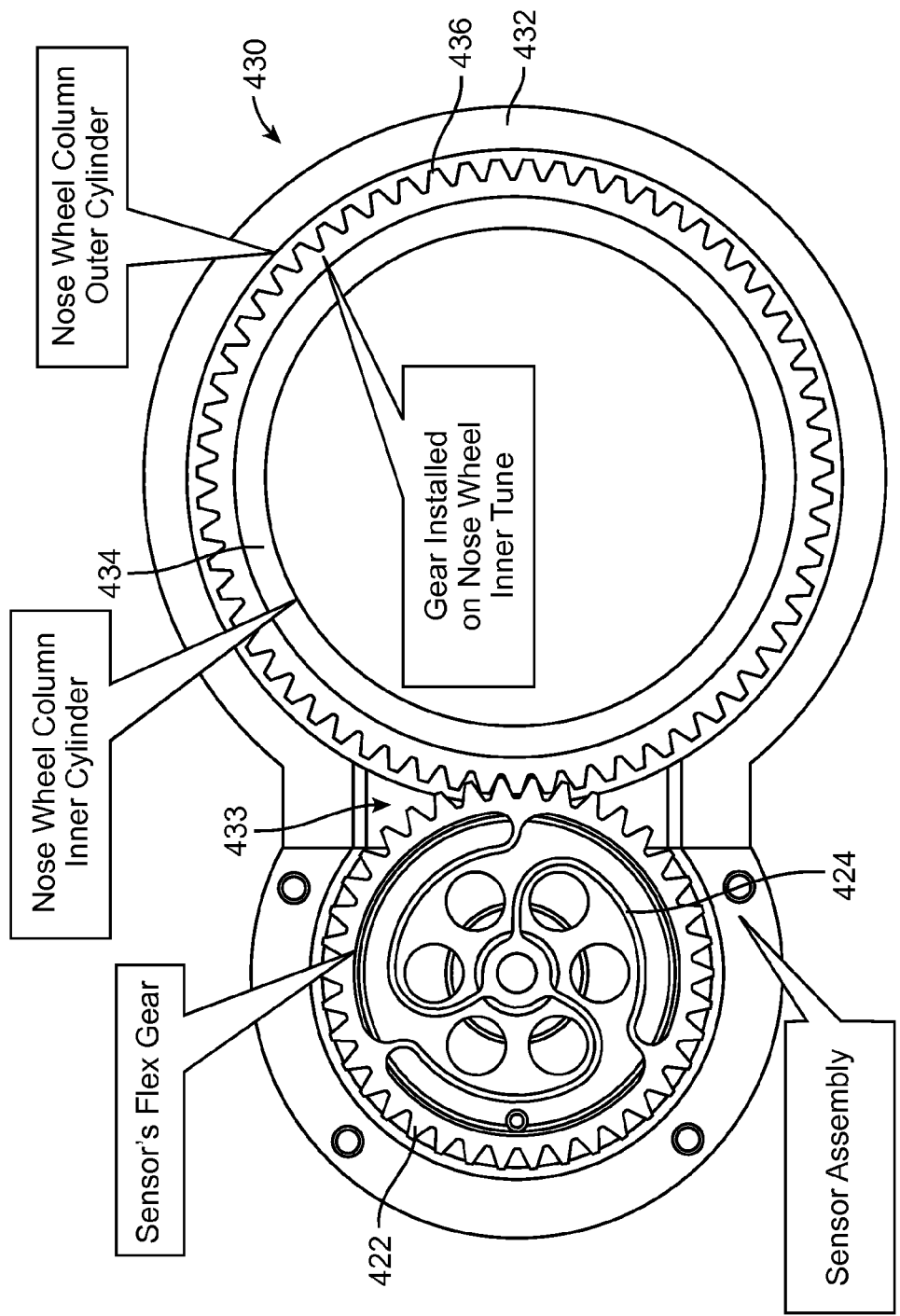
FIG. 4B is a cross-sectional diagram of a nose wheel strut coupled to an interfacing device.

Turning back to FIG. 4A, as noted, the assembly comprising the sensor assembly 410 and the interfacing device (the gear box assembly) 420 is mounted, or otherwise coupled, to the external rotatable structure 430, which in the example embodiments of FIG. 4A is a nose wheel strut (column) of a landing gear of an aircraft, which can rotate the nose wheel coupled to it. With reference to FIG. 4B, a cross-sectional diagram of the nose wheel column 430 coupled to the interfacing device 420 is shown. The nose wheel strut includes, in the depicted example implementations of FIGS. 4A and 4B, an outer cylinder 432 with an opening 433 to receive the flexible gear of the interfacing device. The nose wheel column further includes the nose wheel gear 436 mounted on an inner cylinder 434 disposed within the outer cylinder 432 of the nose wheel strut 430. The nose wheel gear may be configured to, in some embodiments, control the alignment of the wheel(s) (not shown) coupled to the landing gear to, for example, steer an aircraft in a desired direction. For example, clockwise rotation (as viewed from the connector side) of the gear 436 may cause the wheel(s) to likewise rotate clockwise to thus cause the aircraft (when the aircraft is on the ground) to move in a rightward direction, and a counter-clockwise rotation of the gear 436 may cause a similar counter-clockwise rotation of the wheel(s) to cause the aircraft to move in a leftward direction. When the aircraft is airborne, it is important to be able determine the alignment of the wheel(s) and to adjust, if necessary, the alignment of wheel(s) so that the wheel(s) are substantially parallel to the longitudinal axis of the fuselage of the aircraft, particularly when the aircraft is preparing to land. An RVDT sensor assembly, such as the RVDT sensor assemblies described herein, therefore enables the determination of the angular position of the nose wheel gear (such as the gear 436 depicted in FIG. 4B), and thus enables the determination of the aircraft's wheel(s) alignment.

With continued reference to FIG. 4B, rotation of the nose wheel gear 436 also actuates a flexible gear 422 (which may be similar to the flexible gear 510 depicted in FIGS. 5A-I). As described herein, the flexible gear's flexibility, achieved in part from the use of ribs, such as ribs 424, enables the flexible gear to resiliently engage the nose wheel gear 436 even when the two gear are in an imperfect alignment, or when turbulence or strong forces (e.g., which may occur during landing of an aircraft) result in application of strong forces on the flexible gear 422. The rotation of the flexible gear through its engagement with the nose wheel gear 436 causes actuation of the sensor assembly 410 via, for example, the rotation of the pinion 428 coupled to the shaft 426, which engage and actuate, for example, an anti-backlash gear of the RVDT sensor assembly 410. As described herein, rotation of the anti-backlash of the RVDT sensor assembly causes rotation of the rotatable sensor shaft (e.g., the shaft 112 shown in FIG. 1A) which in turn causes rotation of the armatures secured to the rotatable shaft, and thus causes changes to the resultant secondary (output) voltages of the secondary windings in accordance with the angular position of the rotatable shaft (and by extension, in accordance with the angular position of the nose wheel gear).

Figure 6:
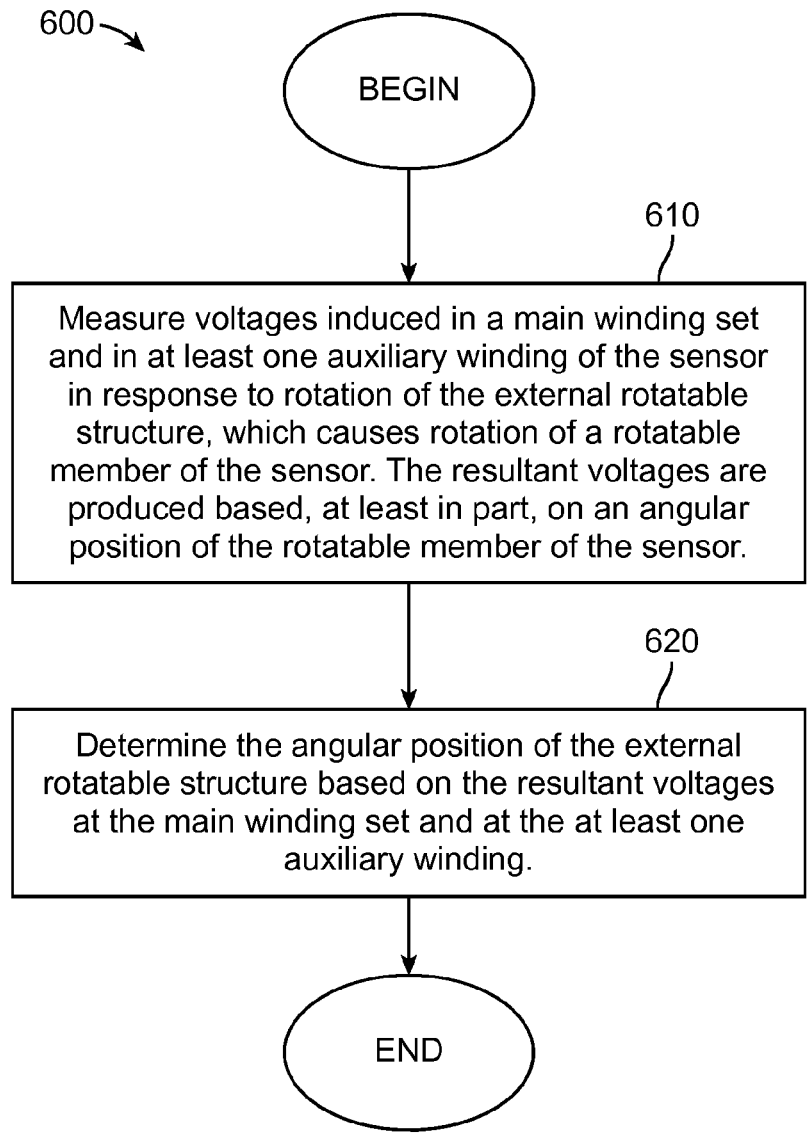
FIG. 6 is a flowchart of an example procedure to determine an angular position of an external rotatable structure.

With reference to FIG. 6, a flowchart of an example procedure 600 to determine an angular position of an external rotatable structure is shown. The procedure includes measuring 610 voltages induced in a main winding set and in at least one auxiliary winding of the sensor in response to rotation of the external rotatable structure. The resultant voltages are produced based, at least in part, on an angular position of a rotatable member of a sensor (such as an RVDT sensor similar to the RVDT sensor assembly depicted in FIG. 1A). Particularly, the external rotatable structure is configured to cause rotation of the rotatable member, for example, via an interfacing device including a gear assembly (e.g., a gear assembly comprising a flexible gear, coupled to a shaft, that itself is coupled to a pinion configured to engage a gear of the sensor assembly). Rotation of the shaft and armatures secured to it causes varying voltages at the main secondary (output) winding and at the at least one auxiliary secondary (output) winding. Measurement of the voltages may be performed using voltage sensors/meters in electrical communication with the windings.

As further described herein, in some embodiments, the external rotatable structure may be a nose wheel strut of an aircraft. However, the RVDT sensor may be used in conjunction with other different types of external rotatable structures, in situations involving different types of applications, to facilitate determining the angular position of such other external rotatable structures.

The angular position of the external rotatable structure is determined 620 based on the resultant voltages at the main winding (i.e., main secondary winding) and at the at least one auxiliary (secondary) winding. As described herein, the resultant voltages at the main secondary winding set may correspond to two possible angular positions. Therefore, in some embodiments, the resultant voltage at the at least one auxiliary secondary winding may be used to determine which of the two possible angles corresponding to the resultant voltages of the main secondary winding set is the correct one (e.g., using a look-up table to correlate between the angles corresponding to the voltage of the auxiliary secondary winding and the voltages corresponding to the main secondary winding). Based on the determined correct angular position of the external rotatable structure, the structure may be rotated (e.g., using a feedback mechanism) to a desirable or required angular position.

Figure 7:
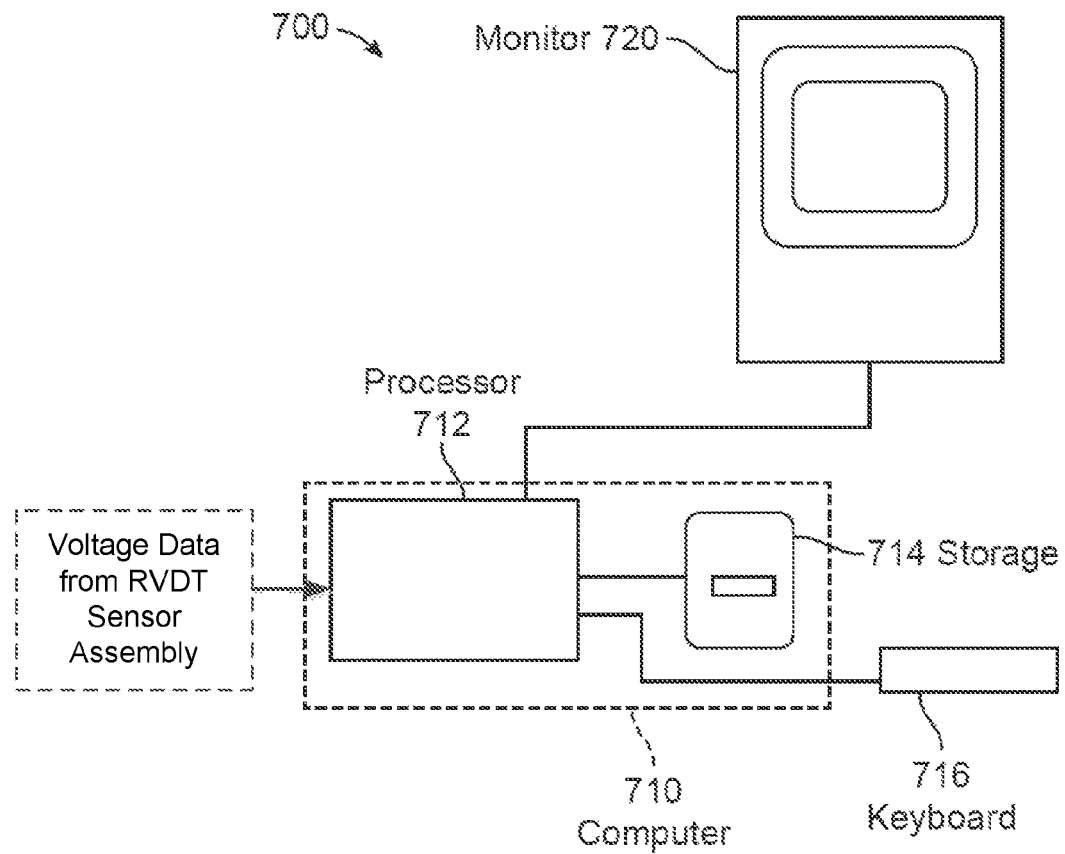
FIG. 7 is a schematic diagram of a generic computing system.

Determination (computation) of the angular position of an external rotatable structure based on measured resultant voltages of a main secondary winding set and of at least one auxiliary secondary winding may be facilitated by a processor-based computing system that receives the measured voltages and outputs a value indicative of a determined/computed angular position of the external rotatable structure. Thus, with reference to FIG. 7, a schematic diagram of a generic computing system 700 is shown. The computing system 700 includes a processor-based device 710 such as a personal computer, a specialized computing device, and so forth, that typically includes a central processor unit 712. In addition to the CPU 712, the system includes main memory, cache memory and bus interface circuits (not shown). The processor-based device 710 may include a mass storage element 714, such as a hard drive associated with the computer system. In some embodiments, the mass storage element 714, when used in the implementations of RVDT sensor assembly described herein, may be used to implement look up tables that associate voltage values (or values representative of measured voltages) to one or more angular positions. The computing system 700 may further include a keyboard, or keypad, 716, and a monitor 720, e.g., a CRT (cathode ray tube) or LCD (liquid crystal display) monitor, that may be placed where a user can access them (e.g., an aircraft's cockpit).

The processor-based device 710 is configured to facilitate, for example, the implementation of determination of an angular position of an external rotatable structure based on voltages measured at the main secondary winding set and at the at least one auxiliary secondary winding set. The processor-based device 710 may also be used in the implementation of a feedback mechanism to actuate the external rotatable structure based on the determined angular position of the structure. As noted, an RVDT sensor assembly, such as the sensor assembly 100 of FIGS. 1A and 1B would generally also include one or more sensors, or meters, to measure voltage values at the windings. The storage device 714 may thus also include a computer program product that when executed on the processor-based device 710 causes the processor-based device to perform operations to facilitate the implementation of the procedures described herein. The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array) or an ASIC (application-specific integrated circuit) may be used in the implementation of the system 700. Other modules that may be included with the processor-based device 710 are speakers, a sound card, a pointing device, e.g., a mouse or a trackball, by which the user can provide input to the computing system 700. The processor-based device 710 may include an operating system, e.g., Windows XP® Microsoft Corporation operating system. Alternatively, other operating systems could be used.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. An assembly to determine an angular position of a rotatable structure external to the assembly, the assembly comprising:
    a sensor including a rotatable member, a main winding set including a main primary winding proximate the rotatable member and a main secondary winding set proximate the rotatable member, and at least one auxiliary winding including at least one auxiliary primary winding proximate the rotatable member and at least one auxiliary secondary winding proximate the rotatable member; and
    a coupling element to couple the sensor to the external rotatable structure to cause rotation of the rotatable member of the sensor in response to rotation of the external rotatable structure;
    wherein resultant one or more voltages at the main secondary winding set correspond to at least two possible angular positions of the rotatable member of the sensor, and wherein at least one resultant voltage at the at least one auxiliary secondary winding is used to determine a correct angular position of the rotatable member, the correct angular position corresponding to the angular position of the external rotatable structure, from the at least two possible angular positions of the rotatable member corresponding to the resultant one or more voltages at the main secondary winding set.

2. The assembly of claim 1 wherein the sensor is a rotary variable differential transformer (RVDT) sensor including:
    the rotatable member,
    at least one armature disposed on the rotatable member,
    the main primary winding proximate the rotatable member and the at least one auxiliary primary winding proximate the rotatable member, and
    the main secondary winding set proximate the rotatable member and at least one auxiliary secondary winding proximate the rotatable member;
    wherein the coupling element includes an interfacing device coupled to the RVDT sensor, the interfacing device configured to engage the external rotatable structure such that rotation of the external rotatable structure will cause rotation of the rotatable member of the RVDT;
    and wherein the rotation of the rotatable member will cause the resultant one or more voltages at the main secondary winding set and the at least one resultant voltage at the at least one auxiliary secondary winding, the resultant one or more voltages and the at least one resultant voltage produced based on voltages applied to the main primary winding and to the at least one auxiliary primary winding, and further based on location of the at least one armature disposed on the rotatable member.

3. The assembly of claim 2, wherein the angular position is determined based on values derived from the resultant one or more voltages at the main secondary winding set and the at least one resultant voltage at the at least one auxiliary secondary winding.

4. The assembly of claim 3, wherein the values derived from the resultant one or more voltages at the main secondary winding set and the at least one voltage at the at least one auxiliary secondary winding includes ratio values determined based on the resultant one or more voltages at the main secondary winding set and the at least one resultant voltage at the at least one auxiliary secondary winding.

5. The assembly of claim 2, wherein the voltages applied at the main primary winding and the at least one auxiliary winding include A/C voltages.

6. The assembly of claim 2, wherein the main primary winding and the at least one auxiliary primary winding are located between the main secondary winding set and the at least one auxiliary secondary winding.

7. The assembly of claim 2, wherein one or more of the main primary winding, the at least one auxiliary primary winding, the main secondary winding set, and the at least one auxiliary secondary winding surround, at least in part, the rotatable member.

8. The assembly of claim 2, wherein the interfacing device comprises a flexible gear to resiliently engage the external rotatable structure.

9. The assembly of claim 8, further comprising:
a support plate coupled to the flexible gear, the support plate configured to maintain the flexible gear in a two-dimensional plane to enable the flexible gear to resiliently flex only in the two-dimensional plane when the flexible gear is engaged to the external rotatable structure.

10. The assembly of claim 2, wherein the main primary windings, the at least one main auxiliary winding, the main secondary winding set, and the at least one auxiliary secondary winding are contained in a hermetically sealed winding cavity of the RVDT sensor.

11. The assembly of claim 2, wherein the interfacing device is configured to engage a rotatable nose wheel landing gear strut of an aircraft.

12. The assembly of claim 2, wherein the main secondary winding set is calibrated to produce main voltages representative of the at least two possible corresponding angular positions of the rotatable member.

13. The assembly of claim 2, further comprising:
at least one power source to provide the voltages applied to the main primary winding and to the at least one auxiliary primary winding.

14. The assembly of claim 2, wherein the main secondary winding set includes one or more of: a tapped main secondary winding, and a pair of main secondary windings.

15. A system to determine an angular position of a rotatable structure external to a rotary variable differential transformer (RVDT) sensor, the system comprising:
the rotary variable differential transformer (RVDT) sensor including:
a rotatable shaft,
at least one armature disposed on the rotatable shaft,
a main primary winding proximate the rotatable shaft and at least one auxiliary primary winding proximate the rotatable shaft, and
a main secondary winding set proximate the rotatable shaft and at least one auxiliary secondary winding proximate the rotatable shaft;
an interfacing device coupled to the RVDT sensor, the interfacing device configured to engage the external rotatable structure to cause rotation of the rotatable shaft of the RVDT sensor in response to rotation of the external rotatable structure; and
a processing module in electrical communication with the RVDT sensor and configured to receive voltage data from the RVDT sensor and to determine a correct angular position of the external rotatable structure from at least two possible angular positions of the external rotatable structure corresponding to resultant one or more voltages at the main secondary winding set based on at the at least one resultant voltage at the at least one auxiliary secondary winding resulting from the rotation of the rotatable shaft, the resultant one or more voltages at the main secondary winding set and the at least one resultant voltage at the at least one auxiliary secondary winding produced based on voltages applied at the main primary winding and at the at least one auxiliary primary winding, and further based on location of the at least one armature disposed on the rotatable shaft.

16. The system of claim 15, wherein the voltages applied at the main primary winding and the at least one auxiliary winding include A/C voltages.

17. The system of claim 15, wherein the interfacing device comprises a flexible gear to resiliently engage the external rotatable structure.

18. The system of claim 17, further comprising:
a support plate coupled to the flexible gear, the support plate configured to maintain the flexible gear in a two-dimensional plane to enable the flexible gear to resiliently flex only in the two-dimensional plane when the flexible gear is engaged to the external rotatable structure.

19. The system of claim 15, wherein the main primary windings, the at least one main auxiliary winding, the main secondary winding set, and the at least one auxiliary secondary winding are contained in a hermetically sealed winding cavity of the RVDT sensor.

20. A method to determine an angular position of a rotatable structure external to a sensor coupled to the external rotatable structure, the method comprising:
measuring resultant voltages induced in a main winding set, including a main primary winding proximate a rotatable member of the sensor and a main secondary winding set proximate the rotatable member, and in at least one auxiliary winding, including at least one auxiliary primary winding proximate the rotatable member and at least one auxiliary secondary winding proximate the rotatable member, of the sensor in response to rotation of the external rotatable structure, the resultant voltages produced based, at least in part, on an angular position of the rotatable member of the sensor, wherein the rotation of the external rotatable structure causes rotation of the rotatable member of the sensor, wherein the resultant voltages comprise resultant one or more voltages at the main secondary winding set corresponding to at least two possible angular positions; and
determining the angular position of the external rotatable structure based on at least one resultant voltage at the at least one auxiliary secondary winding used to determine a correct angular position of the rotatable member, the correct angular position corresponding to the angular position of the external rotatable structure, from the at least two possible angular positions of the rotatable member corresponding to the resultant one or more voltages at the main secondary winding set.

21. The method of claim 20, wherein determining the angular position comprises:
determining the angular position based on ratio values derived from the resultant voltages at the main winding set and at the at least one auxiliary winding.

22. The method of claim 20, wherein the sensor includes a rotary variable differential transformer (RVDT) sensor configured to engage the external rotatable structure, the engaged external rotatable structure causing rotation of a rotatable shaft of the RVDT sensor via an interfacing device.

23. The method of claim 22, wherein the interfacing device comprises a flexible gear to resiliently engage the external rotatable structure.

24. The method of claim 23, wherein the flexible gear is coupled to a support plate configured to maintain the flexible gear in a two-dimensional plane to enable the flexible gear to resiliently flex only in the two-dimensional plane when the flexible gear is engaged to the external rotatable structure.

25. The method of claim 22, wherein the main winding set and the at least one auxiliary winding are contained in a hermetically sealed winding cavity of the RVDT sensor.

26. The method of claim 20, wherein measuring the resultant voltages induced in the main winding set and in the at least one auxiliary winding of the rotatable sensor comprises:
  measuring secondary winding voltages resulting at a tapped main secondary winding of a rotary variable differential transformer (RVDT) sensor and in at least one auxiliary secondary winding of the RVDT sensor, the resultant voltages produced based on one or more voltages applied at a main primary winding and in at least one auxiliary primary winding of the RVDT sensor, and further based on a location of at least one armature disposed on a rotatable shaft of the RVDT sensor.

27. The method of claim 26, wherein the tapped secondary winding is calibrated to produce main voltages representative of at least two possible corresponding angular positions of the external rotatable structure.

* * * * *